US006629435B2

United States Patent
Tomisaka

(10) Patent No.: US 6,629,435 B2
(45) Date of Patent: Oct. 7, 2003

(54) METHOD OF FORMING AN OPTICAL GLASS ELEMENT

(75) Inventor: Toshiya Tomisaka, Yao (JP)

(73) Assignee: Minolta Co., Ltd., Osaka (JP)

( * ) Notice: Subject to any disclaimer, the term of this patent is extended or adjusted under 35 U.S.C. 154(b) by 362 days.

(21) Appl. No.: 09/742,398

(22) Filed: Dec. 22, 2000

(65) Prior Publication Data

US 2001/0039811 A1 Nov. 15, 2001

(30) Foreign Application Priority Data

Dec. 24, 1999  (JP) .......................................... 11-367001

(51) Int. Cl.[7] .............................................. C03B 11/00
(52) U.S. Cl. ............................................. 65/102; 65/64
(58) Field of Search ..................................... 65/64, 102

(56) References Cited

U.S. PATENT DOCUMENTS 4,797,144 A * 1/1989 DeMeritt et al. ............. 65/102
5,192,352 A   3/1993 Kuwabara et al. ......... 65/60.53
5,228,894 A * 7/1993 Sato et al. ..................... 65/102
5,346,522 A * 9/1994 Komiyama et al. ............. 65/64
5,417,730 A   5/1995 Shigyo ......................... 65/111
5,435,818 A * 7/1995 Mashige et al. ........... 65/29.12
5,601,627 A   2/1997 Mashige ...................... 65/102
5,782,946 A   7/1998 Komiyama et al. .......... 65/102
6,079,228 A   6/2000 Tomisaka ..................... 65/102

FOREIGN PATENT DOCUMENTS

| JP | 60-118644 | * | 6/1985 |
| JP | 2-196039  | * | 8/1990 |
| JP | 5-24858   | * | 2/1993 |

* cited by examiner

Primary Examiner—Sean Vincent
(74) Attorney, Agent, or Firm—Morrison & Foerster LLP

(57) ABSTRACT

A method for forming an optical glass element by pressure molding a glass pre-form using top and bottom molds, has steps of heating a glass pre-form held at a position separated from the top and bottom molds by a holding member within the top and bottom molds, pressing the glass pre-form while the glass pre-form is held by the holding member, and moving the bottom mold independently in an upward direction and pressing the glass pre-form again.

12 Claims, 3 Drawing Sheets

*Heating Process*

*1st Pressing Process*

*2nd Pressing Process*

*Heating Process*

*1st Pressing Process*

*2nd Pressing Process*

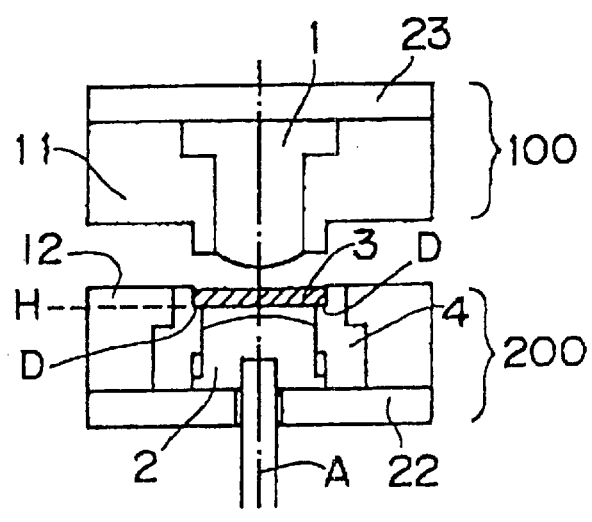
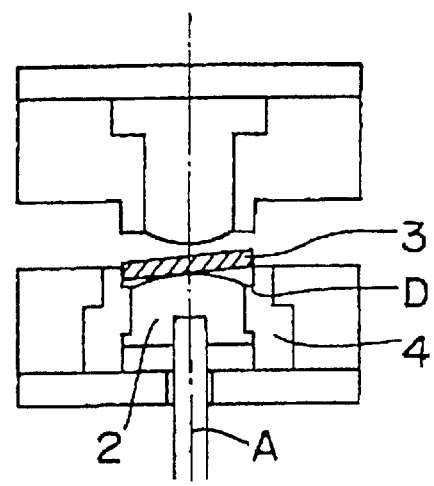
Fig. 3(a)
Heating Process
Fig. 3(a)
Before Press
Prior Art

METHOD OF FORMING AN OPTICAL GLASS ELEMENT

RELATED APPLICATION

This application is based on Patent Application No. 11-367001 filed in Japan, the content of which is hereby incorporated by reference.

BACKGROUND OF THE INVENTION

1. Field of the Invention

The present invention relates to a method of forming an optical glass element, particularly the present invention relates to a method of forming an optical glass element by pressing the glass pre-form.

2. Description of the Related Art

Conventional methods of forming a precision optical element, e.g., a glass lens, by holding a pre-form between a top and bottom mold via a bottom shell having a stage, applying heat, and applying pressure to the top and bottom molds holding the pre-form when a specific temperature has been attained, as disclosed in Japanese Laid-Open Patent Application No. 2-133327. According to this method, however, when the pre-form is under pressure by the mold, the pressing process only applies pressure to the pre-form which is held by the stage part on the exterior surface of the pre-form, and local stress is concentrated on the exterior surface of the pre-form due to the presence of the stage part, such that the glass flow in the diameter direction is hampered on the bottom mold surface side of the pre-form, causing dead space near the exterior surface of the bottom mold surface, and disadvantageously and uncontrollably distorting the surface of the exterior surface of the obtained glass element. The generation of surface distortion is particularly pronounced when the bottom mold has a convex shape. In such optical elements, the area in which the shape of the mold surface shape is not transferred in spite of the intention to transfer such shape, due to the generated surface distortion and the like, is referred to as deformation hereinafter in the present specification.

In order to eliminate these disadvantages, Japanese Laid-Open Patent Application No. 9-286622 discloses art for applying pressure when the pre-form is separated from the stage during the pressing process. This art is briefly described using FIG. 3. The device shown in FIG. 3(a) has a top unit 100 and bottom unit 200, wherein the top unit comprises a top mold 1 having a top shell 11 covering its exterior surface, and a top backplate 23 fixedly attached to these elements, and the bottom unit comprises a bottom mold 2, a holder 4 having a stage D for holding a pre-form 3 and covering the bottom mold, bottom shell 12 for covering the exterior surface of the holder, and a bottom backplate 22 fixedly attached to these elements. That is, in the art of the aforesaid disclosure, a pre-form 3 is held between a top mold 1 and a bottom mold 2 by a holder having a stage, heated (refer to FIG. 3(a)), and when a specific temperature has been attained, the bottom mold 2 is moved while rubbing the holder 4 (bottom shell) via a push rod A, such that the pre-form 3 is under pressure while separated from the stage D (refer to FIG. 3(b)).

When using this art, however, the pre-form is shifted when pressure is applied resulting from the pre-form separating from the stage directly before pressure is applied, such that the obtained optical element has eccentric thickness or eccentricity which presents a problem in regard to precise shape.

SUMMARY OF THE INVENTION

An object of the present invention is to provide a method for forming an improved optical glass element and an optical glass forming apparatus using this method.

An object of the present invention is to particularly provide a method for forming an optical glass element without deformation and having excellent precision of shape, and an optical glass forming apparatus using this method.

These objects are attained by a method for forming an optical glass element by pressure molding a glass pre-form using top and bottom molds, said method comprising a heating process for heating a glass pre-form held at a position separated from the top and bottom molds by a holding member within the top and bottom molds, a first pressing process for applying pressure while the glass pre-form is held by the holding member, and a second pressing process for moving the bottom mold independently in an upward direction and applying pressure.

BRIEF DESCRIPTION OF THE DRAWINGS

These and other objects and features of the invention will become clear from the following description, taken in conjunction with the preferred embodiments with reference to the accompanying drawings, in which:

FIG. 3 is a brief structural view of a device illustrating a conventional optical lens forming method.

DESCRIPTION OF THE PREFERRED EMBODIMENTS

Figure 1A:
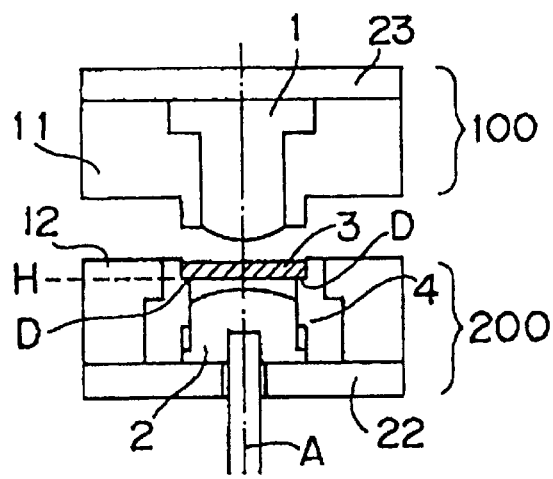
FIG. 1 is a brief structural view of an example of a device using the method of the present invention.

The method of the present invention is described hereinafter with reference to the accompanying drawings. Like or equivalent parts are designated by like reference numbers throughout the several drawings.

FIG. 1 briefly shows the structure of an optical glass element forming device using the method of the present invention. This device specifically includes a holder 4 for holding a glass pre-form, a bottom mold 2 for pressure molding the glass pre-form and which is slidable with the holder, and a top mold 1 for pressure molding a glass pre-form and which is disposed opposite the bottom mold, and further including normally a top shell 11 covering the exterior surface of the top mold 1, a top backplate 23 fixedly attached to the top mold and the top shell, a bottom shell 12 covering the exterior surface of the holder 4, a bottom backplate 22 fixedly attached to the bottom mold 2 and holder 4 and bottom shell 12, and push rod A fixedly attached to the bottom mold 2 through the bottom backplate 22 for vertically moving the bottom mold. The unit comprising the top shell 11 and the top backplate 23 is referred to as the top unit 100, and the unit comprising the bottom mold 2, holder 4, bottom shell 12, and bottom backplate 22 is referred to as the bottom unit 200.

In the present invention, the glass pre-form 3 is heated while being held at a position separated from the top and bottom molds (1, 2) by the holder 4 within the top and bottom molds 1 and 2. When heating the pre-form, the pre-form 3 installed on the stage D of the top end of the holder 4 is heated within the top and bottom molds at a maintained height H so as to not be in contact with the bottom mold 2, as shown in FIG. 1(a). Considering heat efficiency, the heating position H desirably disposes the pre-form 3 near the bottom mold 2 within a range in which the pre-form is not in contact with the bottom mold. For similar reasons, it is also desirable that the top mold 1 is disposed near the pre-form within a range in which the pre-form is not in contact with the top mold.

The stage D is fixed and supports the exterior surface of the pre-form. The stage D normally is formed connected to the interior surface of the top end of the holder, but is not limited to this arrangement inasmuch as it also may be formed, for example, as a stage at three locations of the interior surface so as to support the exterior surface of the pre-form at three support points. The depth and width of the stage D formed oat the top end interior surface of the holder 4 is not particularly limited, insofar as the pre-form can be held fixed, and are determined in accordance with the shape and diameter of the pre-form.

The mold surface of the top and bottom molds are processed to a mirror surface and desired shape, and in the present invention, a surface precision of up to approximately 0.03 mm can be effectively transferred to the pre-form. More specifically, the shape of the top mold and bottom mold is not particularly restricted, e.g., the surface may have a curved shape (including spherical shape) or planar shape, and either mold may have a concave shape or convex shape; in the present invention the bottom mold desirably has a convex shape from the perspective of effectively preventing the surface distortion (deformation) on the exterior surface of the bottom surface of the obtained optical glass element common to conventional methods.

The heater is not particularly limited insofar as it is capable of induction heating to heat the shells (11, 12), and desirably is capable of rapidly heating to a desired temperature. For this reason an induction heatable material is used as the material forming the shells and holder, e.g., cemented carbide, carbon and the like. Although the material of the top and bottom molds is not specifically limited, it is desirable to use aluminum oxide from the perspective of lens appearance quality. In induction heating, heat is conducted to the molds (1, 2) and the pre-form through the shells (11, 12) and the holder. In the present invention, the molds also may be heated using a heat lamp, infrared lamp and the like as a heater. At such time, it is desirable that the shells (11, 12) not be arranged from the perspective of heat conduction efficiency.

The heating temperature may differ depending on the glass type, but normally the pre-form temperature is heated up to the glass softening temperature to the glass softening temperature +50° C.

Figure 1B:
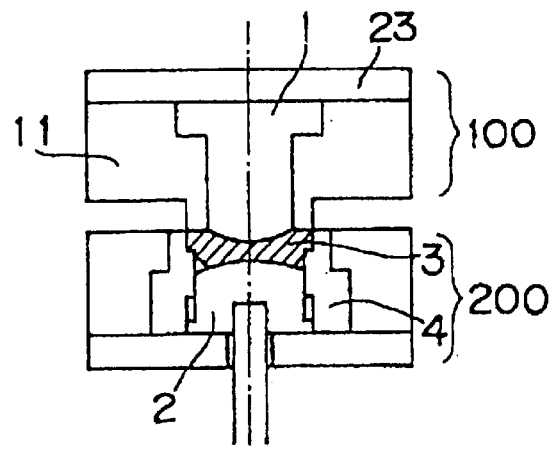
Figure 1C:
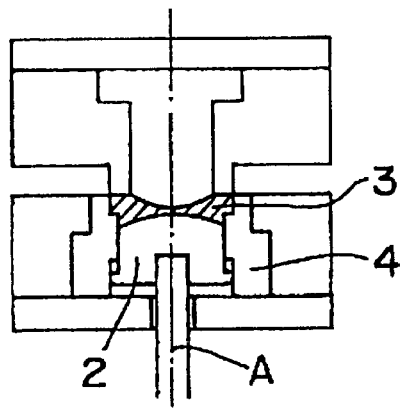

When the pre-form 3 attains a specific temperature, the glass pre-form 3 is held by the holder 4 and pressed (first pressing process), as shown in FIG. 1(b). That is, when pressure is applied, the top surface of the pre-form 3 and the top mold 1 come into contact under pressure before the bottom surface of the pre-form 3 and the bottom mold 2 make contact. By applying pressure in this way, shifting of the pre-form is avoided when pressure is applied, thereby preventing a loss of shape precision caused by eccentric thickness, eccentricity and the like.

In FIG. 1(b), the pressure application is conducted by lowering the top unit 100, although the bottom unit 200 also may be raised. In FIG. 1(b), the top mold 1 is integrated with the top shell 11 to apply pressure, however, the top mold 1 also may independently moved downward to apply pressure by making the top mold 1 independently movable downward, or the top mold 1 also may apply pressure in two stages wherein the top mold 1 and the stop shell 11 are integrated to apply pressure, and thereafter the top mold 1 is independently lowered to apply pressure. In this process it is desirable that the relative positional relationship between the bottom mold 2 and the holder 4 maintains the positional relationship of during the heating process.

The pressure application time and pressure force during the first pressing process are not particularly restricted insofar as the thickness of the molded lens (pre-form) is suitably near a desired center thickness, and the pressure is adequate so as to transfer the mold surface of the top mold 1 to the pre-form 3.

In the present invention, after the first pressing process ends, it is desirable that the pre-form is held in stasis and cooled until the pre-form temperature reaches the vicinity of the glass transition temperature. When the second pressing process is applied above the glass transition temperature, and particularly at a temperature near the softening temperature, there is concern of surface changes due to the comparatively large glass condensation change.

Next, the bottom mold 2 is independently moved upward and pressure applied (second pressing process). That is, the bottom mold 2 is moved upward independently from the holder via the push rod A, and pressure is applied. In this way the pressure force from the bottom mold 2 is applied to the pre-form 3 independently, and facilitates the flow of the glass in the diameter direction, avoiding the formation of dead space near the exterior surface of the bottom mold molding surface, and preventing surface distortion in the exterior surface of the optical glass element.

The driver of the push rod A is not particularly restricted, and various well known means may be used, although an air cylinder, servo motor and the like are desirable. A servo motor is desirable from the perspective of accurate control of the upward moving distance of the push rod A, whereas an air cylinder is desirable from the perspective of ease of changing the pressure force.

The present invention is not limited to independent upward movement of the bottom mold 2, and a pressure force also may be applied independently from the bottom mold 2 to the pre-form 3 by downward movement of the top backplate 23 using a well known driver.

The pressure application time and pressure force are not particularly limited insofar as adequate pressure is applied to achieve a transfer of the molding surface of the bottom mold 2 to the pre-form 3 while eliminating dead space. Normally, the temperature of the glass is near the glass transition temperature of 100° C.

After the second pressing process, the pre-form is cooled by a well known method. For example, after the second pressing process, the pre-form may be held in the state shown in FIG. 1(c) andooled until the pre-form temperature is below 400° C., or after the second pressing process, the top unit 100 may be moved upward to release the pre-form, which is maintained in this state until cooled to the aforesaid temperature.

Another mode of the present invention is described below using FIG. 2. This mode is identical to the previous mode with the exception that the pre-form is held by the bottom shell; therefore detailed description of previously described aspects is omitted. The device in FIG. 2 uses a bottom shell having a stage D as a glass pre-form holding member, and is identical to the device of FIG. 1 with the exceptions of using a concave shape as the shape of the bottom mold 2 and using a bottom shell 12 having a stage D shown in FIG. 2 in place of the bottom mold 2 and holder 4 of FIG. 1. That is the device of FIG. 2 specifically includes a bottom shell 12 for holding a glass pre-form 3, a bottom mold 2 for pressure molding the glass pre-form and which is slidable with the bottom shell 12, and a top mold 1 for pressure molding a glass pre-form and which is disposed opposite the bottom mold, and further including normally a top shell 11 covering the exterior surface of the top mold 1, a top backplate 23 fixedly attached to the top mold and the top shell, a bottom backplate 22 fixedly attached to the bottom mold 2 and bottom shell 12, and push rod A fixedly attached to the bottom mold 2 through the bottom backplate 22 for vertically moving the bottom mold.

Figure 2A:
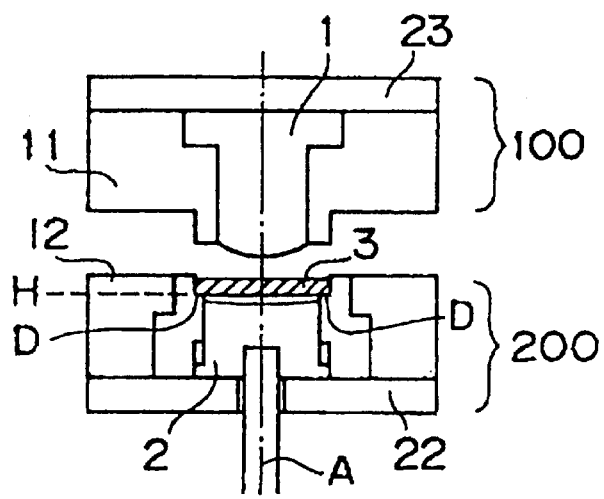
FIG. 2 is a brief structural view of an example of a device using the method of the present invention.
Figure 2B:
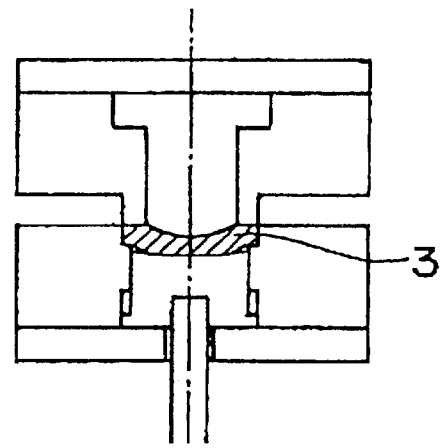
Figure 2C:
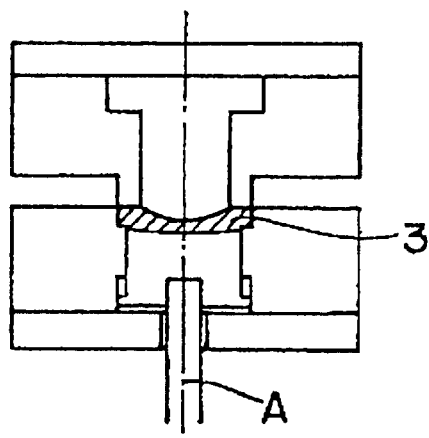

In the present mode, the glass pre-form 3 is heated while being held at a position separated from the top and bottom molds (1, 2) by the bottom shell 12 within the top and bottom molds 1 and 2, as shown in FIG. 2. That is, when heating the pre-form, the pre-form 3 installed on the stage D of the top end of the bottom shell 12 is heated within the top and bottom molds at a maintained height H so as to not be in contact with the bottom mold 2, as shown in FIG. 2(*a*).

When the pre-form 3 attains a specific temperature, the glass pre-form 3 is subjected to a pressure application while being held by the bottom shell 12 as shown in FIG. 2(*b*). That is, when pressure is applied, the top surface of the pre-form 3 and the top mold 1 come into contact under pressure before the bottom surface of the pre-form 3 and the bottom mold 2 make contact.

Next, the bottom mold 2 is independently moved upward and pressure applied (second pressing process). That is, the bottom mold 2 is moved upward independently from the bottom shell 12 via the push rod A, and pressure is applied. When the second pressing process ends, the pre-form is cooled by a well known method.

The optical glass element obtained by this method has excellent shape precision and is without deformation.

Although the present invention is described in detail in the following examples, the invention is not limited to these examples.

EXAMPLE 1

From a glass pre-form planar in shape and having a major diameter of 23 mm and thickness of 3 mm was formed a biconcave lens having an effective diameter of 18 mm, center thickness of 1 mm, top concave surface radius of curvature of 23 mm, and bottom concave surface radius of curvature of 35 mm using the device shown in FIG. 1.

The material of the top and bottom molds 1 and 2 was aluminum oxide, and the top and bottom shells 11 and 12 and the holder 4 were formed of cemented carbide. Since the aluminum oxide is not thermally conductive, the exterior surface of the mold is covered by a shell or shell and holder formed of cemented carbide which can conduct heat. Accordingly, the heat supplied by a heater not shown in the illustration is transferred to the mold and the pre-form through the shell or the shell and the holder.

When the pre-form 3 was set at the heating holding position a the difference between the height (H) of the top end flat surface of the holder 4 and the height of the surface apex of the molding surface of the bottom mold was set at 2 mm. The width of the stage D of the holder was set at 2 mm, and the depth was set at 4 mm.

After heating, the top unit 100 was lowered, and a first pressing process was performed by the top and bottom molds, and after the lens shape was attained, induction heating was stopped, and cooling was started at 50° C./min. When the mold temperature was near the glass transition temperature, the bottom mold 2 was independently slid upward by the air cylinder to perform the second pressing process.

Five separate pre-forms were formed by the aforesaid process, and when the molded surface of the obtained lenses were measured using an interferometer, surface precision of ¼ or less was confirmed.

When 150 shot lenses were formed and measured, the occurrence of adhesion was less than 1.8%, and inclined eccentricity was less than 2.8 parts, while the percentage of lenses having a surface precision of ¼ or less was over 90%. There was no visible deformation on the periphery of the lenses.

COMPARATIVE EXAMPLE 1

For comparison, a lens was obtained in the same manner as in example 1 with the exception that the device of FIG. 3 was used, and directly before the pressing process the bottom mold 2 was moved upward as shown in FIG. 3(*b*), and after the pre-form 3 was pushed up, the top unit 100 was lowered and the pre-form was subjected to the pressing process. This process was repeated 50 times, and when the obtained lenses were measured, there was no difference noted in the surface precision of ¼ or less, but the percentage of lenses having eccentric thickness and inclined eccentricity of 4 parts or more was 1.8%, and were deemed to be unsatisfactory. This phenomenon is believed to be caused by the generation of inclination of the pre-form when the pre-form was pushed upward by the bottom mold, and pressure was applied in this state.

EXAMPLE 2

From a glass pre-form planar in shape and having a major diameter of 32 mm and a thickness of 4 mm was formed a meniscus lens having an effective diameter of 28 mm, center thickness of 2 mm, top concave surface radius of curvature of 90 mm, and bottom convex surface radius of curvature of 180 mm.

The top unit 100 is common to example 1. The bottom unit 200 had a bottom mold 2, and bottom shell 12 covering the exterior surface of the bottom mold 2, and the bottom shell 12 was fixedly attached to the bottom backplate 22.

The lens was formed in the same manner as in example 1 with the exception that the bottom shell 12 had pre-form holding function, the holder of FIG. 1 was not used, and the mold 2 was fixed to the bottom shell 12 so as to be slidable. In this example, a servo motor was used as the method for sliding the bottom mold 2. The servo motor had the function of controlling the pressure force and positioning.

When 100 shot lenses were formed by this process and measured, the occurrence of adhesion was less than 2%, and inclined eccentricity was less than 2.3 parts, while the percentage of lenses having a surface precision of ¼ or less was over 90%. Process capability index was improved to CP=1.3 relative to a CP=0.8 of the conventional process due to the servo positioning effectiveness.

According to these examples, the pressure force is readily transferred to the bottom of the stage holding the pre-form by the first pressing process in which pressure is applied as the pre-form is held by a holding member, and the second pressing process in which pressure is applied after slidably moving only the bottom mold, thereby improving transferability of the edges of the formed optical element, and providing excellent surface precision, as well as providing high shape precision (precision with regards to eccentricity and eccentric thickness) by stabilizing the inclination of the pre-form.

Although the present invention has been fully described by way of examples with reference to the accompanying drawings, it is to be noted that various changes and modification will be apparent to those skilled in the art.

Therefore, unless otherwise such changes and modifications depart from the scope of the present invention, they should be construed as being included therein.

What is claimed is:

1. A method for forming an optical glass element by pressure molding a glass pre-form using top and bottom molds, comprising:

heating a glass pre-form held at a position separated from the top and bottom molds by a holding member within the top and bottom molds, pressing the glass pre-form while the glass pre-form is held by the holding member, and moving the bottom mold independently in an upward direction and re-pressing the glass pre-form.

2. A method as claimed in claim 1, wherein induction heating is used to heat the glass pre-form.

3. A method as claimed in claim 1, further comprising:

cooling the glass pre-form before re-pressing the glass pre-form until the pre-form temperature reaches the vicinity of the glass transition temperature.

4. A method as claimed in claim 1, wherein an air cylinder is used to press the glass pre-form.

5. A method as claimed in claim 1, wherein a servo motor is used to press the glass pre-form.

6. A method as claimed in claim 1, further comprising:

cooling the glass pre-form after re-pressing the glass pre-form.

7. A method for forming an optical glass element comprising:

heating a glass pre-form held at a position separated from the top and bottom molds by a holding member within the top and bottom molds, applying pressure to the glass pre-form while the glass pre-form is held by the holding member, and moving the bottom mold independently in an upward direction and pressing the glass pre-form.

8. A method as claimed in claim 7, wherein induction heating is used to heat the glass pre-form.

9. A method as claimed in claim 7, further comprising:

a cooling process for cooling the glass pre-form before pressing the glass pre-form while the glass pre-form is held by the holding member until the pre-form temperature reaches the vicinity of the glass transition temperature.

10. A method as claimed in claim 8, wherein an air cylinder is used to press the glass pre-form.

11. A method as claimed in claim 1, wherein a servo motor is used to press the glass pre-form.

12. A method as claimed in claim 1, further comprising:

cooling the glass pre-form after moving the bottom mold independently in an upward direction and pressing the glass pre-form.

* * * * *